United States Patent [19]

Takei

[11] Patent Number: 5,611,977
[45] Date of Patent: Mar. 18, 1997

[54] METHOD FOR FORMING AN ARMREST

[75] Inventor: Noriyuki Takei, Akishima, Japan

[73] Assignee: Tachi-S Co., Ltd., Tokyo, Japan

[21] Appl. No.: 601,773

[22] Filed: Feb. 15, 1996

[30] Foreign Application Priority Data

Feb. 28, 1995 [JP] Japan .................................. 7-063506

[51] Int. Cl.⁶ ............................ B29C 44/06; B29C 44/12
[52] U.S. Cl. ...................... 264/46.5; 264/46.6; 264/46.7; 264/275; 29/468
[58] Field of Search ...................... 264/275, 46.7, 264/46.6, 46.5; 297/411.24, 411.25, 411.26; 29/464, 468

[56] References Cited

U.S. PATENT DOCUMENTS

| 4,436,276 | 3/1984 | Donahue | 264/275 |
| 4,908,170 | 3/1990 | Kurimoto | 264/46.7 |
| 4,948,541 | 8/1990 | Beck | 264/46.7 |
| 5,135,593 | 8/1992 | Quirin | 264/46.7 |
| 5,190,707 | 3/1993 | Yanagishita | 264/46.7 |
| 5,478,136 | 12/1995 | Takeuchi et al. | 264/46.7 |

FOREIGN PATENT DOCUMENTS

| 4-790 | 1/1992 | Japan . |
| 5-44100 | 11/1993 | Japan . |
| 6-312425 | 11/1994 | Japan . |

*Primary Examiner*—Allan R. Kuhns
*Attorney, Agent, or Firm*—Browdy and Neimark

[57] ABSTRACT

A method for forming an armrest, wherein there are provided a three-dimensional box-like trim cover assembly having slit and hole formed therein, a frame and a shaft separate from the frame. In the method, the frame is inserted through the slit into the inside of the trim cover assembly, and then, the shaft is inserted through the hole into the same inside of trim cover assembly, so that the shaft is connected to the frame at a predetermined position within the trim cover assembly via a connecting element. Thereafter, such incomplete armrest unit is subject to foaming in a foaming die, to thereby form a complete armrest. The trim cover assembly includes a high-density foam layer and an impregnation preventive film having plural ventilation holes formed therein in order to prevent impregnation of liquid foaming material into a foam wadding layer of trim cover assembly and attain air permeability of armrest.

11 Claims, 5 Drawing Sheets

FIG.12

METHOD FOR FORMING AN ARMREST

BACKGROUND OF INVENTION

1. Field of the Invention

The present invention relates to a method for forming an armrest for an automotive seat, and more particularly to a method of such foaming type wherein a base foaming urethane material in liquid is injected into a preformed three-dimensional trim cover assembly within a foaming die and then foamed therein to attain an armrest body for use on an automotive seat.

2. Description of Prior Art

Figure 1:
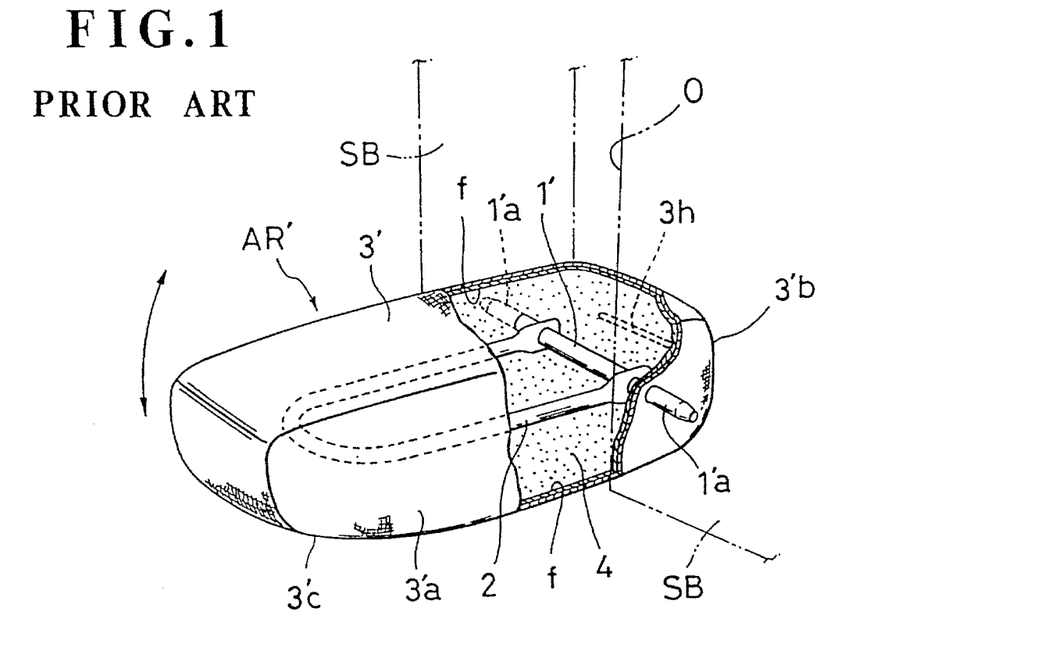
FIG. 1 is a partly broken perspective view of a conventional armrest.

There has been known such type of armrest, as shown in FIG. 1, which is rotatably secured in a predetermined storage space (O) between two seat backs (SB) (SB) of an automotive seat. This armrest (AR') has a support shaft (1') which is rotatably secured, at both ends (1'a)(1'a) thereof, to each of the seat backs (SB), allowing the armrest body to be rotatable vertically about the shaft (1') as indicated by the arrows.

Figure 2:
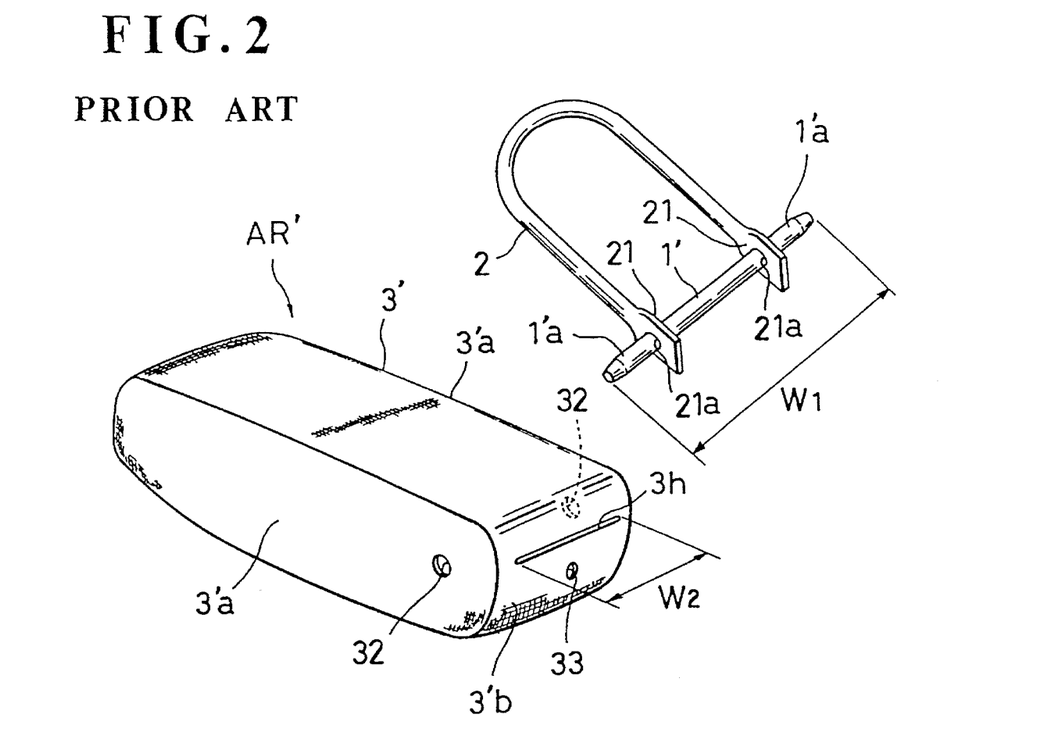
FIG. 2 is a schematic perspective view showing constituent elements of the conventional armrest.
Figure 8:
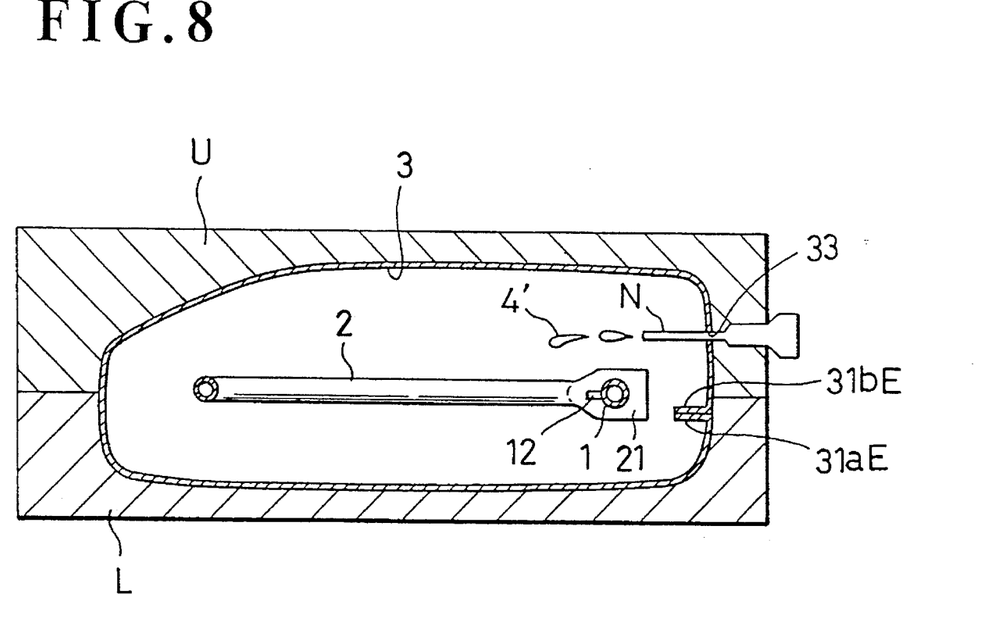
FIG. 8 is a sectional view showing the state where the incomplete unit of armrest is placed in a foaming die and subject to foaming.

As can be seen in FIGS. 1 and 2, this conventional armrest (AR') comprises a trim cover assembly (3'), a foam cushion member (4'), a generally U-shaped frame (2) and the foregoing support shaft (1'). The shaft (1') has been welded in the two holes (21a) formed respectively in the flattened end portions (21) of the frame (2), such that both two ends (1'a) of shaft (1') extend outwardly from the respective lateral frame sections of frame (2). The trim cover assembly is preformed generally in a three-dimensional manner to assume a closed box-like configuration, having two through-holes (32) formed in the respective lateral sides (3'a) thereof and an elongated slit (3h) formed in the rearward side (3'b) thereof. Designation (33) stands for a hole into which an injection nozzle is inserted for a foaming purpose. The process for forming the armrest (AR') is such that a worker uses his or her hands to insert the frame (2) into within the preformed three-dimensional trim cover assembly (3') by inserting both curved part of the frame (2) and support shaft (1') through the elongated slit (3h) into the trim cover assembly (3'), and then expose the two outwardly projected ends (1'a) of shaft (1') out of the respective two through-holes (32) of trim cover assembly (3'), after which, the thus-prepared armrest (3') is set in a foaming die (as seen in FIG. 8), with an injection nozzle (N) being inserted through the hole (33) into within the trim cover assembly (3'), and a base foaming material (4') in liquid is injected from the nozzle (N) and filled in the trim cover assembly (3'). Then the liquid foaming material is cured therein to form a foam cushion member (4) so as to obtain such armrest body (AR') shown in FIG. 1.

However, this prior-art method has been found defective in that, because of the entire length (W1) of shaft (1') being greater than the width (W2) of elongated hole (3h), it is difficult to smoothly insert both ends (1'a) of shaft (1') through the hole (3h) into within the trim cover assembly (3) and even more difficult to quickly pass both shaft ends (1'a) through the respective through-holes (32) outwardly of the trim cover assembly (3'). In worst case, it causes a break or tear in the edges of both elongated hole (3h) and through-holes (32), or at any portion of trim cover assembly (3) where a worker's hand force is greatly exerted, resulting in the leakage of a liquid foaming material (4') through such break and tear during a foaming process. Also, the liquid foaming material (4') is leaked through the elongated slit (3h) to the outside of armrest (AR').

In addition, most of the trim cover assembly employed for this forming of armrest is of the lamination structure wherein a wadding layer of slab urethane foam material is laminated on the inner surfaces of a top cover layer for a soft-touch effect, and thus it has been proposed to attach a synthetic resin film (f), as shown in FIG. 1, to the surface of that wadding layer, which is disclosed by the Japanese Granted U.M. Pubs. Nos. 4-790 and 5-44100 for instance, whereby a base foaming material in liquid is prevented by the film from being impregnated into the foam wadding layer in the foaming process, and therefore, the liquid foaming material will not be cured in the soft wadding layer, thus maintaining soft touch of armrest body. But, even in that case, as the film (f) itself is impermeable, the whole air permeable effect of armrest body occupied by the permeable materials, i.e. top cover layer, foam wadding layer and foam cushion member, is deteriorated by the film (f), as a result of which, a cushioning degree of armrest body is extremely decreased, and when stored in the storage space (see the designation (O) in FIG. 1) between the seat backs (SB), the surface area (3'c) of armrest (3'), on which the back of passenger contacts, does not give any optimal ventilation to absorb sweat or wet from the passenger's back, which makes the passenger feel discomfort at his or her back.

SUMMARY OF THE INVENTION

In view of the above-stated drawbacks, it is therefore a primary purpose of the present invention to provide a method for forming an armrest, which permits frame and shaft to be easily set and connected together at a predetermined position within a trim cover assembly, without any break or tear caused in the trim cover assembly.

To achieve such purpose, in accordance with the present invention, there is basically provided the steps of:

providing a frame;

providing a shaft independently of the frame;

the frame and shaft including a connecting means for connecting the shaft to the frame at a predetermined position;

providing a preformed three-dimensional trim cover assembly of closed box-like type which includes one cover section having an opening means formed therein and a pair of lateral cover sections, wherein a pair of through-holes are formed in the respective two lateral cover sections;

inserting the frame through the opening means into an inside of the trim cover assembly;

thereafter, inserting one end of the shaft into one of the pair of through-holes of trim cover assembly;

manipulating the shaft via the connecting means so as to connect the shaft to the frame at the predetermined position within the trim cover assembly;

then, exposing such one end of shaft outwardly from another of the pair of through-holes of trim cover assembly, to thereby mount the frame and shaft within the trim cover assembly, whereby an incomplete unit of armrest is formed;

thereafter, placing the incomplete unit of armrest in a foaming die;

injecting a base foaming material in liquid into the inside of trim cover assembly placed in the foaming die;

and subjecting the incomplete unit of armrest to foaming in the foaming die so as to create a foam cushion member in the trim cover assembly, thereby forming a complete armrest with the shaft projecting its two ends from the lateral sides thereof.

Accordingly, the shaft, which is normally longer than the opening means of trim cover assembly, can be inserted separately into the trim cover assembly via the through-hole and connected to the frame at a predetermined position within the trim cover assembly, which facilitate forming the armrest without any break or tear in the trim cover assembly.

Preferably, the connecting means may comprise a stopper projection formed on the shaft, and a hole formed in the frame, so that the shaft may be inserted through the hole and set at a predetermined position in the frame due to the stopper projection contacting a part of the frame adjacent to the hole. In this respect, a notch may be formed in the frame such as to communicate with the hole, and a rotation preventive projection be formed on the shaft, whereby the rotation preventive projection will be engaged in the notch to prevent the shaft against rotation in the frame. Further, as another alternative mode, the connecting means may comprise a stopper means and a stopper receiving means formed on the shaft, in addition to the hole formed in the shaft, so that, after inserting the shaft in that hole, a stopper means may be attached to the stopper receiving means, to thereby connect the shaft to the frame at a predetermine position.

It is a second purpose of the present invention to prevent impregnation of the liquid foaming material into a foam layer of the trim assembly during the foaming process and retain a whole air permeability of armrest.

For that purpose, the trim cover assembly comprises a permeable top cover layer, a low-density foam layer, an impregnation preventive film having plural ventilation holes formed therein, and a high-density foam layer, in this order. Accordingly, both impregnation preventive film and high-density foam layer prevent most of the liquid foaming material against impregnation into the low-density foam layer forming the so-called foam wadding layer of trim cover assembly, during the foaming process. Additionally, all those layers are permeable to assure a full air permeability of resulting complete armrest body, thus not only realizing a deep cushioning degree of armrest, but also absorbing sweat and wet from the back of passenger contacting the surface of armrest when the armrest is stored in the storage opening defined in a seat back of seat.

It is a third purpose of the present invention to prevent leakage of the liquid foaming material from the foregoing opening means of trim cover assembly during the foaming process.

To this end, the opening means comprises a slit which is defined between two extensions of trim cover assembly which are turned inwardly towards each other, extending to the inside of trim cover assembly. Hence, the slit is normally closed tightly by virtue of the elastically expanding property of those two extensions, and further, will be more tightly closed by a high pressure from an expanding mass of resulting foam cushion member in the trim cover assembly, during the foaming process, whereby the liquid foaming material is prevented prevented against leaking from the slit.

DETAILED DESCRIPTION OF PREFERRED EMBODIMENTS OF THE INVENTION

Referring to FIGS. 1 through 12, there is illustrated a method for forming an armrest of the same kind with the prior-art armrest (AR') described above, in accordance with the present invention.

Figure 3:
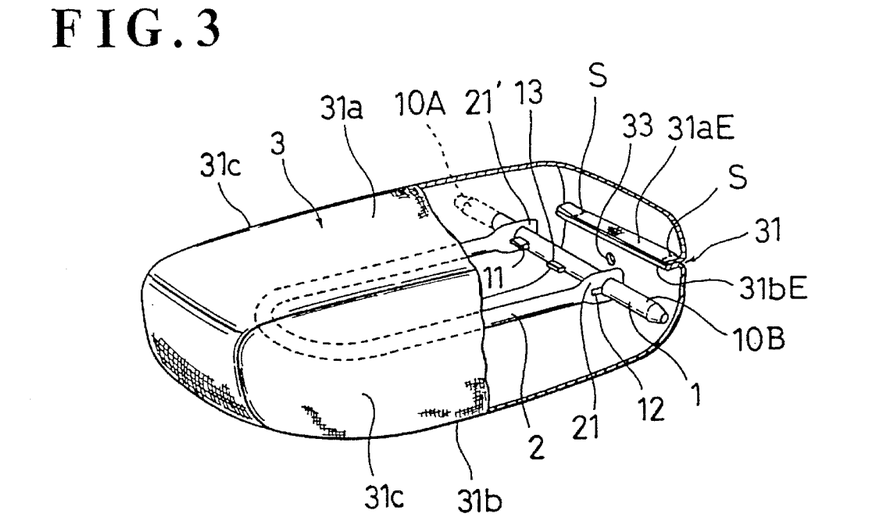
FIG. 3 is a partly broken perspective view of an incomplete unit of armrest in accordance with the present invention.
Figure 5:
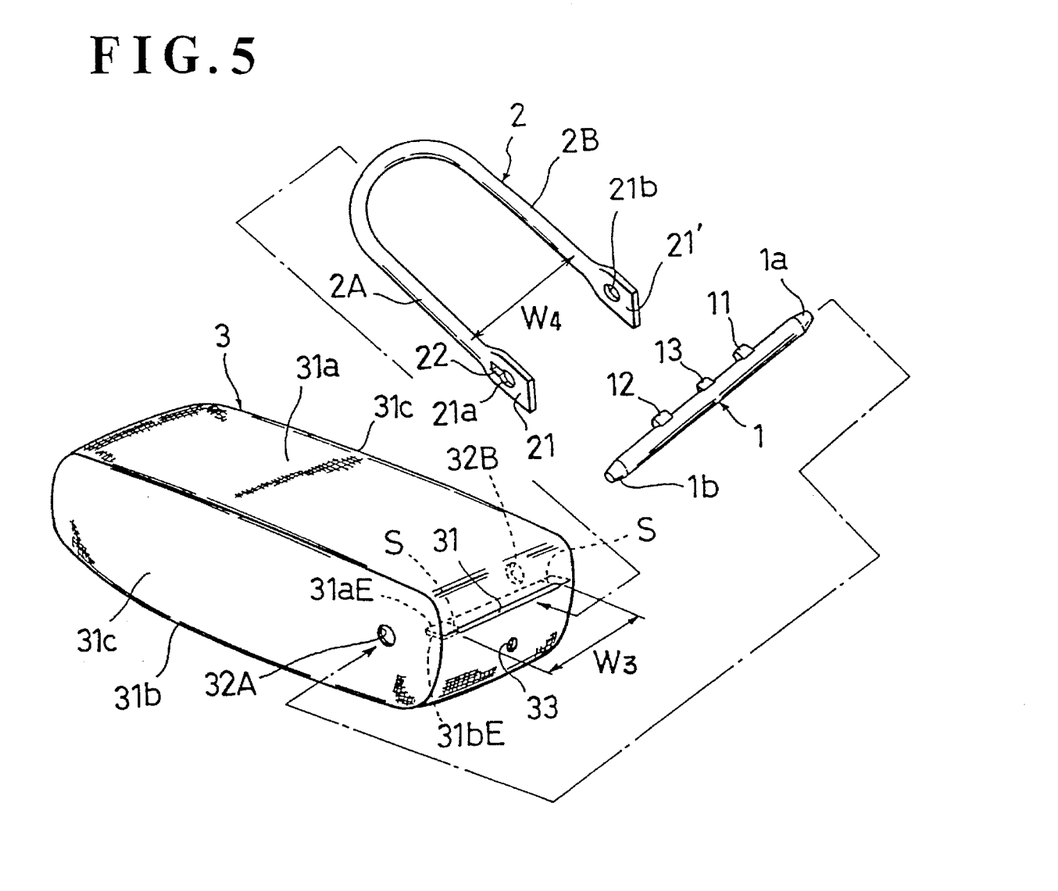
FIG. 5 is an exploded schematic perspective view of constituent elements of the incomplete unit of armrest in accordance with the present invention.

FIG. 3 schematically shows a structure of an incomplete unit of armrest prepared prior to a subsequent foaming process, in accordance with a method of the present invention, which will be described later. FIG. 5 shows principal constituent elements for forming such incomplete armrest unit. Namely, as similar to the prior-art armrest (AR'), in the present invention, there are provided a preformed closed-box-like trim cover assembly (3), a generally U-shaped frame (2), and a support shaft (1).

Figure 6:
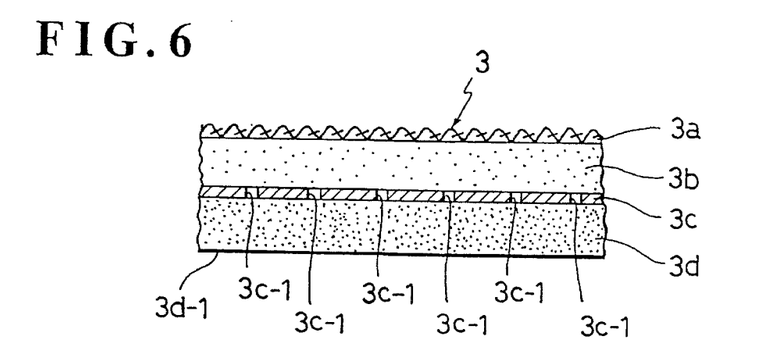
FIG. 6 is a partial sectional view of the trim cover assembly of the armrest in accordance with the invention.

As viewed from FIGS. 3 and 5, the trim cover assembly (3) is preformed into the illustrated box-like three-dimensional configuration, almost same in shape and sizes with the prior-art trim cover assembly (3') shown in FIGS. 1 and 2, by connecting together an upper cover section (31a), a pair of lateral cover sections (31c) (31c) and a lower cover section (31b) as by sewing. In accordance with the present invention, the trim cover assembly (3) is of such four-layer lamination construction as shown in FIG. 6, which comprises a top cover layer (3a), a permeable low-density foam layer (3b), an impregnation preventive film (3c) and a permeable high-density foam layer (3d) in this order.

The top cover layer (3a) is formed from a cloth or woven fabric material, as known in the art, but this is important to enhance the air permeability of armrest body. In accordance with the present invention, for that purpose, the film (3c) is formed with a plurality of small ventilation holes (3c-1) therein.

The low-density foam layer (3b) is equivalent to what is called a wadding layer of a continuous-cellular slab urethane foam, which is laminated with the inward surface of top cover layer to form a trim cover assembly for vehicles, as is known in the art.

The high-density foam layer (3d) is formed from a continuous-cellular polyurethane foam having a high density relative to the foregoing wadding layer (3b).

As shown in FIG. 6, the impregnation preventive film (3c) is sandwiched between those two foam layers (3b) (3d). The film (3c) is formed from a synthetic resin material such as vinyl chloride.

Figure 4:
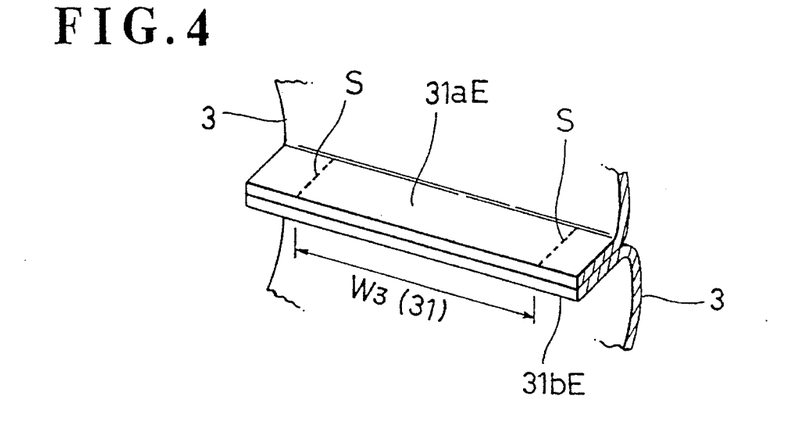
FIG. 4 is a partly broken perspective view of two juxtaposed extensions formed in a trim cover assembly of the armrest in accordance with the present invention.

The upper and lower cover sections (31a) (31b) are each provided with first and second inwardly turned extensions (31aE) (31bE), respectively. As can be seen in FIG. 3, the formation of those two extensions (31aE) (31bE) is such that, at the rearward side of trim cover assembly (3), they are turned inwardly towards each other, with both outer top cover layer surfaces thereof in contact with each other, and thus juxtaposed with each other to extend generally at a right angle from the inner surface of that rearward side of trim cover assembly (3) towards the inside hollow thereof. In this respect, as best shown in FIG. 4, the juxtaposed first and second extensions (31aE) (31bE) are sewn together at two spaced-apart points by the two lines of sewing threads (S)(S). Those two sewn points are spaced apart from each other a distance (W3) to provide an elongated entry slit (31) extending transversely of the rearward side of trim cover assembly (3). Hence, the entry slit (31) has a length (W3). As in FIG. 5, this length (W3) should be slightly greater than a width (W4) of two spaced-apart lateral frame sections (2A) (2B) of the U-shaped frame (2) in order to permit smooth insertion of that frame (2) through the entry slit (31). This advantageously makes the entry slit's length (W3) smaller than the slit (3h) of the prior-art armrest (AR'). In this regard, the entry slit (31) is so formed that it can be opened wide enough to permit entry of one worker's hand therein for a purpose of subsequent armrest forming processes to be described later. Further, the entry slit (31) is normally closed neat in a resilient way by virtue of the elastically expandable property of the four-layer trim cover assembly which includes such elastic foam layers (3b) (3d).

Designations (32A) (32B) denote first and second through-holes, respectively. Each of them is formed in the respective two lateral cover sections (31c) (31c) of trim cover assembly (3) and are adapted to let the shaft (1) inserted therethrough, into the inside of trim cover assembly (3).

Designation (33) denotes a hole into which an injection nozzle (N) is inserted for the purpose of injecting a liquid foaming material (4') (see FIG. 8) into within the trim cover assembly (3), which will be explained later.

The generally U-shaped frame (2) is shown to have a pair of spaced-apart lateral frame sections (21A) (21B), each having a first flattened end portion (21) and a second flattened end portion (21'), respectively. While the second flattened end portion (21') is formed with a second hole (21b) of mere circular shape, the first flattened end portion (21) has, formed therein, a circular first hole (21a) and a notch (22), such that the notch (22) communicates directly with the second hole (21b).

The shaft (1) is provided separately from the foregoing frame (2), in accordance with the present invention. The entire length of shaft (1) is equal to that (1') of the prior-art armrest (AR'). In accordance with the present invention, there is provided a connecting means for connecting the shaft (1) to both first and second flattened end portions (21) (21') of frame (2) at a predetermined position. As one of modes embodying such connecting means, FIGS. 3 and 5 show a stopper projection (11), a rotation preventive projection (12) and an operation grip projection (13), which are all integrally formed on the shaft (1), and further show a notch (22) which is formed in the first flattened end portion (21) of frame (2), communicating with the first hole (21a) thereof. As will become understood, those three projections (11)(12)(13) and notch (22) facilitate the ease with which the shaft (1) is connected to the first and second end portions (21)(21') of frame (2) at a predetermined position. In that generic sense, within the gist of the present invention, the first and second holes (21a) (21b) are one of the connecting means mentioned above.

Specifically, as in FIG. 5, the shaft (1) has, formed integrally thereon, a stopper projection (11), a rotation preventive projection (12) and an operation grip projection (13), with such an arrangement that those three projections (11) (12) (13) are disposed abreast of and equidistant from one another within a predetermined range upon the shaft (1), and that the stopper projection (11) is disposed adjacent to one end (1a) of the shaft (1), while the rotation preventive projection (12) is disposed adjacent to another end (1b) of the same shaft (1), and the operation grip projection (13) is situated between the stopper and rotation preventive projections (11) (12).

The shaft (1) is of a diameter slightly smaller than each diameter of the first and second holes (21a) (21b) of frame (2), and each of the three projections (11) (12) (13) is of a dimension slightly smaller than the notch (22) of frame (2).

Accordingly, in assembling the armrest (AR), a worker may firstly insert one end (1a) of the shaft (1) into the first hole (21a) of the frame (2), and then continue to insert the shaft end (1a) through the second hole (21b), while allowing all the projections (11) (12) (13) to pass through the notch (22) of frame (2), thereby connecting the shaft (1) to the frame (2) as seen in FIG. 3. Here, it is important that the previously mentioned "predetermined range upon the shaft (1)", in which the three projections (11) (12) (13) are disposed, should be such that, when passing the shaft (1) through both first and second holes (21a) (21b) of frame (2), the stopper projection (11) contacts the inward wall of second flattened end portion (21') of frame (2) to stop and set the shaft (1) at a predetermined position relative to the frame (2), while at the same time, the rotation preventive projection (12) is just engaged in the notch (22) of first flattened end portion (21) of frame (2), as can be seen from FIG. 3. It is to be understood that the stopper projection (11) serves to position the shaft (1) at a predetermined point relative to the frame (2) so as to project both ends (1a) (1b) of shaft (1) outwardly at a same length from the respective two lateral frame sections (2A) (2B) of frame (2), and that the rotation preventive projection (12) cooperates with the notch (22) of frame (2) to prevent the shaft (1) against rotation in both holes (21a) (21b) of frame (2).

Now, a description will be made of steps for forming an armrest from the above-described constituent elements.

At first, the U-shaped frame (2) is introduced into within the preformed trim cover assembly (3) by firstly inserting the curved frame section of frame (2) into the entry slit (31) formed in the trim cover assembly (3) as indicated by the one-dot chain line in FIG. 5, and then inserting the whole body of frame (2) through the entry slit (31) into the inside hollow of trim cover assembly (3).

Secondly, the shaft (1) is introduced into the trim cover assembly (3) by firstly inserting its one end (1a) into the first through-hole (32A). At this stage, a worker should open and widen the entry slit (31) of trim cover assembly (3), and insert his or her one hand therethrough to set the frame (2) at a proper position within the trim cover assembly (3) in order to easily pass such shaft end (1a) through the first hole (21a) of frame (2). After the shaft end (1a) is inserted through the first hole (21a) in that way, the worker then should use his or her same one hand within the trim cover assembly (3) to grasp the operation grip projection (13) of shaft (1), and manipulate the grip projection (13) to rotate the shaft (1) about the longitudinal axis thereof and orient the same in a proper direction, to thereby move on the shaft (1) within the trim cover assembly (3) while passing the stopper and operation grip projections (11) (12) of shaft (1) through the same first hole (21a), until the shaft end (1a) passes through the opposite second frame hole (21b). Thereafter, the worker should finish passing the shaft end (1a) through that second through-hole (32B) of trim cover assembly (3) and project it outwardly therefrom.

At this moment, the stopper projection (11) of shaft (1) contacts the inward wall of second frame flatten end portion (21') to prevent the shaft against further movement through all the holes (32A, 21a, 21b, 32B). Simultaneously, the rotation preventive projection (12) of shaft (1) is just engaged in the notch (22) of frame (2). Hence, the shaft (1) is connected to the frame (2) and positioned precisely relative to both frame (2) and trim cover assembly (3), with both ends (1a) (1b) thereof projecting in a same length from the respective two lateral cover sections (13c) (31c) of trim cover assembly (3), and also prevented against rotation in the frame (2), as seen in FIG. 3.

Next, the thus-formed incomplete armrest unit is placed between lower and upper foaming dies (L) (U) as shown in FIG. 8. Of course, each of the dies (L) (U) has a recessed foaming area which conforms to the outer corresponding shape of the trim cover assembly (3). Although not shown, the dies has support portions for receiving and securing both ends (1a) (1b) of shaft (1) therein in the manner shown in FIG. 8.

Figure 9:
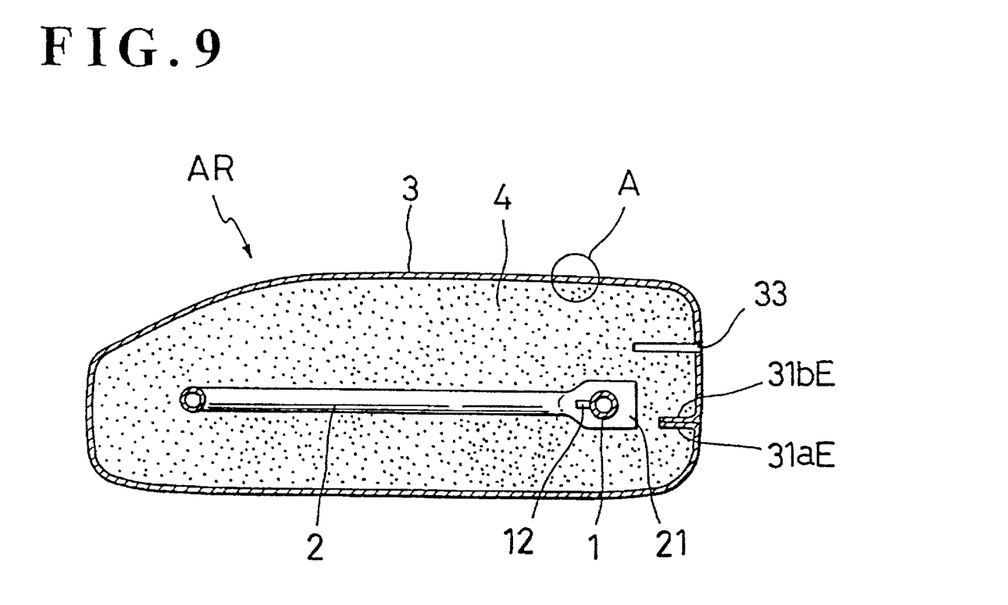
FIG. 9 is a sectional view of a resulting armrest formed in accordance with the present invention.

Then, an injection nozzle (N) is thrust into the hole (33) of trim cover assembly (3) to project in the hollow thereof. A base foaming material (4') in liquid is injected from the nozzle (N) into within the trim cover assembly (3) and subject to foaming therein. Consequently, a foam cushion member (4) is formed in the trim cover assembly (3), and after taking out the trim cover assembly (3) from the dies (U) (L), there is obtained a complete armrest (AR) as shown in FIG. 9.

Figure 7:
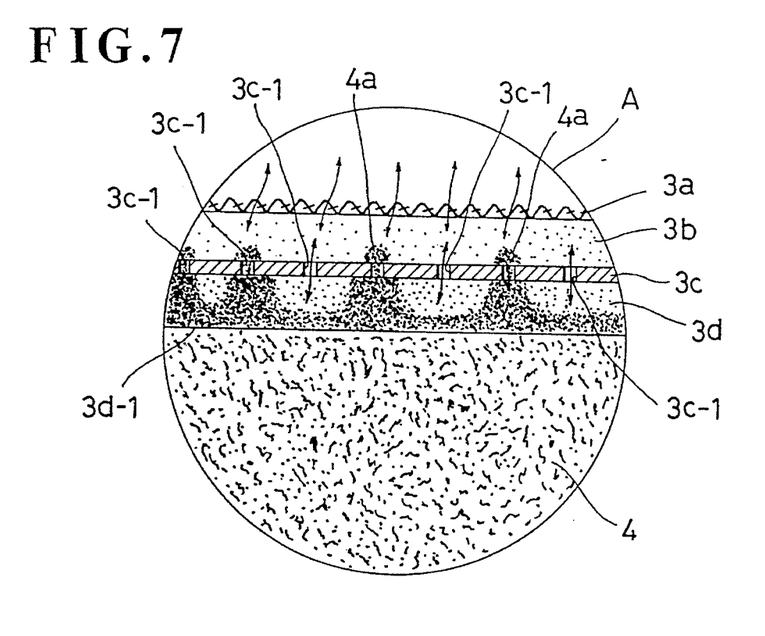
FIG. 7 is an enlarged view taken from the circle "A" in FIG. 9.

During this foaming process, as understandable from FIG. 7, the liquid foaming material (4') injected from the nozzle (N) is not impregnated into the low-density foam wadding layer (3b) of trim cover assembly (3), because most of the liquid foaming material (4') is prevented by the high-density foam layer (3d) against impregnation thereinto, as seen from the thick dot patterns, and even some of the liquid foaming material (4') leaked from that high-density foam layer (3d) is prevented by the film (3c) against impregnation into the foam wadding layer (3d). Designations (4a) indicate small spots of cured foaming material which have been leaked through the ventilation holes (3c-1) of film (3c) into the wadding layer (3b). It is noted, however, that most of the ventilation holes (3c-1) remain opened by virtue of the high-density foam layer (3d) blocking the impregnation of most of liquid foaming material (4') therethrough, during the foaming process, and such particular low-degree impregnation into the wadding layer (3b) is limited to the areas of trim cover assembly (3) where an injection pressure is high from the nozzle (4) jetting out the liquid foaming material (4') thereinto, or dependent upon the foaming conditions. In this regard, preferably, the ventilation holes (3c-1) should each be about 0.5 to 2 mm in diameter and further they should be distributed in the film (3) at the density rate of 50 to 60 pieces per 100 cm². Also, preferably, the high-density foam layer (3d) should have a density of not less than 0.04 g/cm³ in order to reduce the impregnation of liquid foaming material (4') as low as possible thereinto, to thereby limit the amount of liquid foaming material leaking through the ventilation holes (3c-1) of film (3) into the foam wadding layer (3b), at a tolerable level that does not affect the smooth air permeability of resulting armrest body (AR).

Furthermore, during the foaming process, the juxtaposed two extensions (31aE) (31bE) of trim cover assembly (3) are firmly pressed together by a high pressure from the expanding mass of the resulting foam cushion member (4), in addition to the original elastic expanding property of the two extensions (31aE) (31bE) mentioned above, so that the entry slit (31) is tightly closed to insure preventing leakage of the liquid foaming material (4') therefrom.

Figure 10:
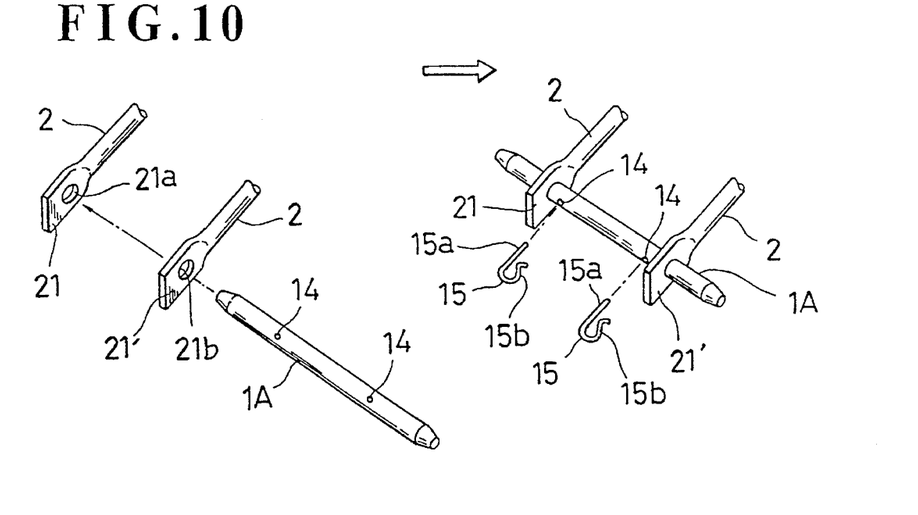
FIG. 10 is a partly broken schematic perspective view of another modes in the present invention.
Figure 11:
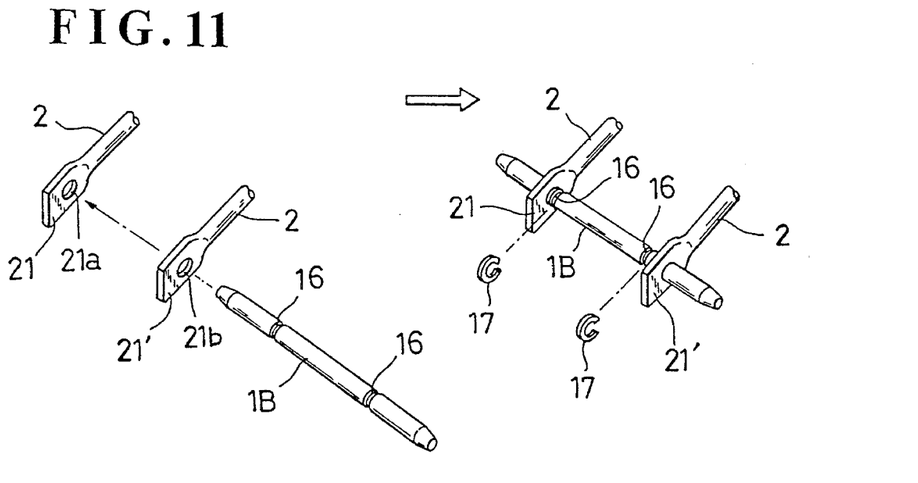
FIG. 11 is a partly broken schematic perspective view of still another modes in the present invention.
Figure 12:
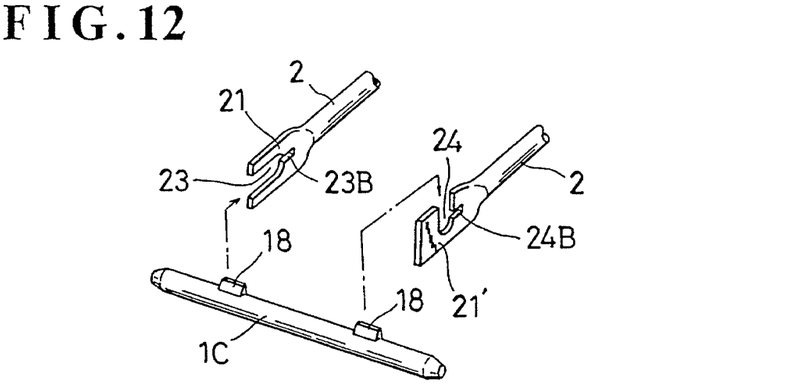
FIG. 12 is a partly broken schematic perspective view of yet another modes in the present invention.

Reference is now made to FIGS. 10, 11 and 12, which show three other modes embodying the previously stated shaft securing means, equivalent to the notch (22) and three projections (11) (12) (13) shown in FIGS. 3 and 5. Thus, those three modes are alternatives, within the gist of the present invention, to the foregoing first mode, which have a common purpose for the easy connecting and positioning of a shaft to the frame (2) in view of the separate relation between the shaft and frame in the present invention, and are not limitative. Descriptions will be made hereinafter in regard to each of the three modes, using the same U-shaped frame (2), but explanation is deleted on the above-described specific armrest forming steps which are also applied to each of the three modes, for the sake of simplicity of descriptions.

In FIG. 10, a shaft (1A) is utilized, which is identical in shape and size to the foregoing shaft (1), except that a pair of spaced-apart holes (14) (14) are formed therein, instead of the three projections (11) (12) (13), and that a pair of clips (15) (15) are provided. According to this mode, after inserting the shaft (1A) through both first and second holes (21a) (21b) of frame (2) as illustrated, the worker should set the shaft (1A) in the two end portions (21) (21') of frame (2) and then firmly attach the two clips (15) to the shaft (1A) by inserting the pin portion (15a) of each clip (15) into the respective two spaced holes (14) (14) and causing the U-shaped portions (15b) of the clips (15) to resiliently engage the shaft (1A). Accordingly, the shaft (1A) is easily connected to the frame (2) and located at a predetermined position relative to the frame (2), while being retained against removal therefrom. It is noted that the two holes (14) (14) should be spaced apart from each other a distance slightly smaller than the width (W4) of frame (2) to avoid wobbling of the shaft (1A) in the frame (2).

In FIG. 11, a shaft (1B) is utilized, which is identical in shape and size to the foregoing shaft (1), except that a pair of spaced-apart annular grooves (16) (16) are formed on the circumferential surface of shaft (1B), instead of the three projections (11) (12) (13), and a pair of C-shaped securing rings (17) (17) are provided. In the present mode, after inserting the shaft (1B) through both first and second holes (21a) (21b) of frame (2) as illustrated, the worker should set the shaft (1B) in the two end portions (21) (21') of frame (2) and then attach the two C-shaped rings (17) (17) about the respective two annular grooves (16) (16). Accordingly, the shaft (1B) is easily connected to the frame (2) and located at a predetermined position relative to the frame (2), while being retained against removal therefrom. It is also noted that the two annular grooves (16) (16) should be spaced apart from each other a distance slightly smaller than the width (W4) of frame (2) to avoid wobbling of the shaft (1A) in the frame (2).

In FIG. 12, a shaft (1C) is utilized, which is identical in shape and size to the shaft (1), except that a pair of spaced-apart projections (18) (18) are formed thereon, instead of the foregoing three projections (12) (13) (14). In this particular mode, the first flattened end portion (21) of frame (2) is so formed to have a first cut-away part (23) defined therein, which extends along the longitudinal direction thereof and a notch (23B) communicating with the cut-away part (23), whereas the second flattened end portion (21') of frame (2) is so formed to have a second cut-away part (24B) defined therein, which extends in a direction intersecting the longitudinal direction thereof. With this structure, the shaft (1C) is more easily connected to the frame (2) without the insertion of shaft through the two holes as found in the modes stated above, because a worker can engage the two projections (18) (18) of shaft (1C) into the respective two notches (23B) (24B) through the respective two cut-away parts (23) (24), while grasping the shaft (1C) as it is. In this case, the shaft (1C) may be directly brought into within the trim cover assembly (3) through the entry slit (31) and then, after such engagement of the two projections (18) in the the respective two notches (23B) (24B) through the respective two cut-away parts (23) (24), both ends of shaft (1) be projected outwardly through the respective holes (32A) (32B) of trim cover assembly (3).

From the descriptions above, it is appreciated that in accordance with the present invention, a support shaft (1, 1A, 1B, 1C) is separate from an armrest frame (2), hence allowing those shaft and frame to be easily connected together at a predetermined position in a trim cover assembly (3) via the above-mentioned connecting means (22A, 11, 12, 13, 14, 15 . . . ), without any break or tear in the trim cover assembly (3) as found in the prior art, and additionally, the formation of ventilation holes (3c-1) in an impregnation preventive film (3c) and lamination of a high-density foam layer (3d) on that film (3c) are effective in not only preventing the impregnation of a liquid foaming material (4') into the wadding layer (3b) of trim cover assembly (3), but also attaining a sufficient air permeability of armrest body, whereby the original cushioning degrees of all foam layers (3b, 3d, 4) are maintained to give a deep cushioning effect and a good ventilation is achieved to absorb sweat or wet from the back of a passenger contacting the surface of armrest, when the armrest is stored in the storage space (O) as in FIG. 1.

In addition, the whole air permeability of trim cover assembly (3) eliminates the need to form any air bleeding holes therein, which is required in the case of the prior-art armrest (AR') having an impermeable impregnation film (f).

While having described the present invention thus far, it should be understood that the invention is not limited to the illustrated embodiments and may be modified in any other modes, with its related structural replacements and additions, without departing from the scopes of the appended claims.

What is claimed is:

1. A method for forming an armrest, comprising the steps of:

providing a frame;

providing a shaft independently of said frame;

said frame and shaft including a connecting means for connecting said shaft to said frame at a predetermined position;

providing a preformed three-dimensional trim cover assembly of closed box-like type which includes one cover section having an opening means formed therein and a pair of lateral cover sections, wherein a pair of through-holes is formed, with one through-hole in each lateral cover section;

inserting said frame through said opening means into an inside of said trim cover assembly;

thereafter, inserting one end of said shaft into one of said pair of through-holes of said trim cover assembly;

manipulating said shaft via said connecting means so as to connect the shaft to said frame at the predetermined position within said trim cover assembly;

then, exposing said one end of said shaft outwardly from another of said pair of through-holes of said trim cover assembly, to thereby mount said frame and shaft within said trim cover assembly, whereby an incomplete unit of armrest is formed;

thereafter, placing said incomplete unit of armrest in a foaming die;

injecting a base foaming material in liquid into the inside of said trim cover assembly placed in said foaming die; and subjecting said incomplete unit of armrest to foaming in said foaming die so as to create a foam cushion member in said trim cover assembly, thereby forming a complete armrest with said both ends of said shaft projecting from lateral sides thereof.

2. The method as defined in claim 1, wherein said connecting means comprises a hole formed in said frame, through which hole, said shaft is to be inserted, and a stopper projection formed on said shaft, and wherein, at said step of manipulating said shaft via said connecting means, the method further includes the steps of inserting said shaft through said hole of said frame until said stopper projection of the same shaft contacts a part of said frame adjacent to said hole, whereby said shaft is connected to said frame at said predetermined position.

3. The method according to claim 2, wherein said connecting means further comprises a notch which is formed in said frame such as to communicate with said hole of said frame, and a rotation preventive projection formed on said shaft, and wherein, at said step of manipulating said shaft via said connecting means, the method further includes the steps of inserting said shaft through said hole of said frame until said stopper projection contacts the part of said frame adjacent to said hole and engaging said rotation preventive projection in said notch, whereby said shaft is connected to said frame at said predetermined position and prevented against rotation in said frame.

4. The method according to claim 3, wherein said connecting means further comprises a grip projection formed on said shaft, said grip projection being disposed between said stopper and rotation preventive projections, whereby a worker grasps said grip projection to rotate said shaft about the longitudinal axis thereof and orient the same shaft in proper direction so as to facilitate inserting the shaft through said hole of said frame.

5. The method as defined in claim 1, wherein said connecting means comprises: a hole formed in said frame, through which hole, said shaft is to be inserted; a stopper means for defining a stopper for preventing said shaft against removal from said frame; and a stopper receiving means provided on said shaft, said stopper receiving means being for receiving said stopper means at a predetermined point in said shaft, and wherein, at said step of manipulating said shaft via said connecting means, the method further includes the steps of inserting said shaft through said hole of said frame so as to position said stopper receiving means of said shaft relative to said frame, and then attaching said stopper means to the thus-positioned stopper receiving means, whereby said shaft is connected to said frame at said predetermined position.

6. The method according to claim 5, wherein said stopper means comprises at least one clip and said stopper receiving means comprises at least one hole which is formed at said predetermined point in said shaft, and wherein said at least one clip is attached over said shaft by being inserted in said at least one hole, to thereby connect said shaft to said frame.

7. The method according to claim 5, wherein said stopper means comprises at least one generally C-shaped ring and said stopper receiving means comprises at least one annular groove which is formed at said predetermined point on a circumferential surface of said shaft, and wherein said at least one generally C-shaped ring is attached about said at least one annular groove, to thereby connect said shaft to said frame.

8. The method as defined in claim 1, wherein said trim cover assembly comprises a permeable top cover layer, a low-density foam layer, an impregnation preventive film having a plurality of ventilation holes formed therein and a high-density layer, in this order.

9. The method as defined in claim 1, wherein said opening means comprises a slit which is defined between two juxtaposed parts of said trim cover assembly which extends towards the inside of the same trim cover assembly.

10. The method according to claim 9, wherein said two juxtaposed parts of said trim cover assembly are sewn with each other at two spaced-apart points, such that said slit is defined between said two spaced-apart points.

11. The method according to claim 5, wherein said stopper means comprises a pair of projections formed on said shaft, wherein said stopper receiving means comprises: a pair of first and second cut-away parts which are formed in said frame such that said first cut-away part extends in a direction intersecting a direction in which said second cut-away part extends; and a pair of notches which are so formed in said frame as to communicate with said pair of first and second cut-away parts, respectively, and wherein said shaft is inserted in said pair of first and second cut-away parts of said frame, and then said pair of projections formed on said shaft are each engaged in the respective said pair of notches of said frame, thereby connecting said shaft to said frame.

* * * * *